Sept. 22, 1959    G. L. ROBINSON    2,904,856
CORNER BEAD
Filed May 21, 1957

INVENTOR.
George L. Robinson
BY

United States Patent Office 2,904,856
Patented Sept. 22, 1959

2,904,856

CORNER BEAD

George L. Robinson, Omaha, Nebr.

Application May 21, 1957, Serial No. 660,541

1 Claim. (Cl. 20—74)

This invention relates to corner beads for protecting the corners of interior walls, more particularly it is an object of this invention to provide a corner bead which can be produced far more economically than has ever heretofore been available.

Corner beads, as they are popularly used at this time, are made entirely of metal and it is an object of my invention to provide a laminated corner bead made partially of paper or other inexpensive material for reducing the cost.

Many years ago paper corner reinforcing strips were popular although they were completely covered on the outside by joint cement whereby they did not serve the corner protecting purpose that is much more effectively provided by a metal corner bead. It is therefore an object of my invention to provide a corner bead formed partially of paper which is adapted to protect a corner from becoming crushed, nicked and marred, as so frequently happens when a corner is struck by furniture being moved, children's tricycles, etc.

A further object of the invention is to provide a corner bead having one side shorter than the other whereby the short side can be applied to that side of a corner which is formed by an overlapping piece of wallboard and to provide a less costly construction.

Still another object of my invention is to provide a corner bead which need not be nailed to the corner. The installation of each of many nails in the corner bead is a separate operation by itself involving several motions and a considerable total time consumption whereby it is an object of this invention to provide a corner bead which can be applied to the wall in a lesser time and at a lesser labor cost than heretofore.

A further object is to provide a corner bead partially made of paper which has apertures therethrough as has never been used before in paper wall covering of the type earlier used in reinforcing corners, nor of the type presently used in covering cracks in flat wall surfaces.

A further object of the invention is to provide a corner bead which is more strongly bonded to the corner than corner beads presently used.

A further object of the invention is to provide a corner bead which needs only one coat of joint cement on its outer surface rather than two coats of joint cement as commonly used with corner beads now on the market. Two coats of corner bead cement are necessary with the latter corner beads because there is no joint cement under the corner bead. In the use of my corner bead sufficient joint cement oozes out beyond the terminal edges to provide a sufficiently smooth fit that only one coat of joint cement over the outer side of the corner bead is necessary.

Laminated metal and paper corners have been used heretofore. However they have had the paper on the outside of the corner as was probably believed to be the only way the corner could be constructed whereby the metal would be sufficiently bonded into the corner. It is therefore an object of my invention to provide a laminated corner bead on which the paper is on the underside of the metal whereby these problems are eliminated.

A further disadvantage of the type of corner in which the paper is on the outside of the metal is that during sanding of the corner after the last coat of joint cement has been applied, the paper sometimes becomes sanded away as makes a very unsightly appearance.

A further disadvantage of the type of corners above described lies in the fact that the metal is in the form of a right angle without an outwardly protruding bead on the corner. This has been necessary because a bead would make the use of paper on the outside of the metal unworkable as the paper would not follow the contour of the outwardly protruding beaded corner closely. The lack of a bead on the corner of the reinforcing device is impractical because the layers of joint cement are unprotected by a protruding bead and easily chip away.

Other and further objects and advantages of the present invention will be apparent from the following detailed description, drawings and claim, the scope of the invention not being limited to the drawings themselves as the drawings are only for the purpose of illustrating a way in which the principles of this invetion can be applied.

Other embodiments of the invention utilizing the same or equivalent principles may be used and structural changes may be made as desired by those skilled in the art without departing from the present invention and the purview of the appended claim.

Figure 1:
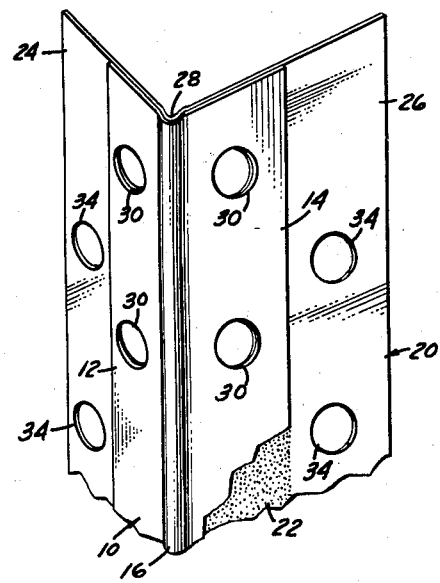
Figure 1 is a frontal elevation of a portion of a corner bead of my invention.
Figure 2:
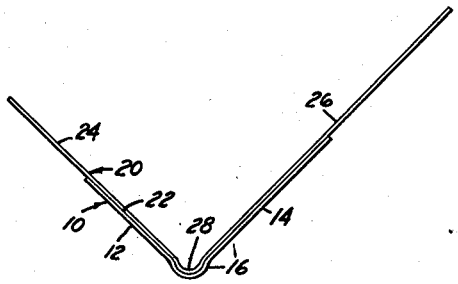
Figure 2 is a top plan view of a corner bead of Figure 1.

The bead shown in Figures 1 and 2 are approximately twice the preferred actual dimensions.

Figure 3:
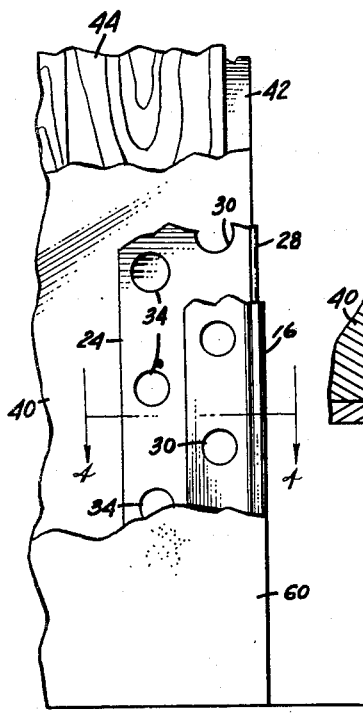
Figure 3 is a side elevation of portions of the new corner bead as applied to a wall, parts of the latter being broken away for convenience of illustration.
Figure 4:
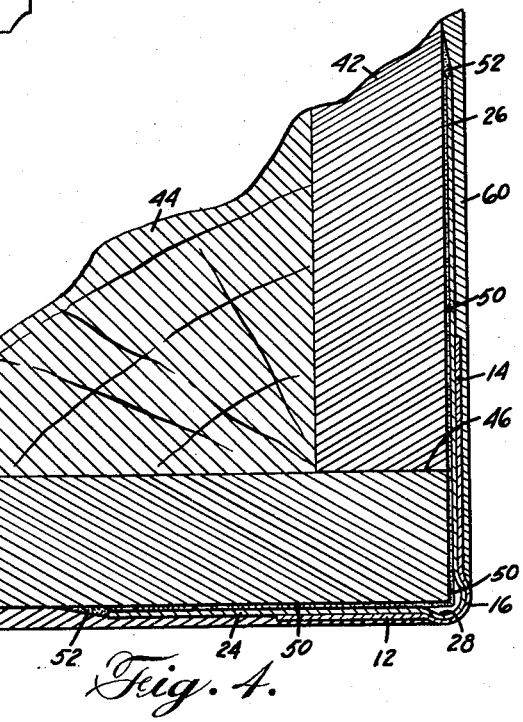

Figure 4 is a vertical cross-section through a corner as seen along the line 4—4 of Figure 3. The view of Figure 4 is twice the scale of Figure 2.

Referring to Figure 1, the corner bead of this invention is there shown and has an outer metal part 10 which is preferably of steel and which has been electro-bonderized to provide it with a surface to which joint cement could adhere. The metal 10 has also preferably been galvanized for providing it with resistance to moisture.

The metal piece or strip of material 10 is L-shaped in cross-section as shown in Figure 2 and is of substantially a right angle in shape inasmuch as it has two legs 12 and 14 which are disposed at a right angle with respect to each other. The legs 12 and 14 are interconnected by an outwardly protruding portion 16 which is itself sometimes the bead and can be referred to as the bead protection here. Portion 16 is concave on the underside and convex on the outer side and is of the same thinness as the legs 12 and 14 being formed integrally therewith out of the same metal.

The metal piece 10 is elongated and is adapted to extend along the edge of an interior wall corner.

In accordance with this invention then a layer of paper 20 is attached to the rearward side of the metal piece 10 and is bonded thereto by a rubber base glue material at 22. The paper 20 is of a special type commonly used in dry wall construction for the purpose of taping over cracks in flat walls. The paper 20 therefore is sufficiently stiff to hold the shape shown unless it should become unduly bent or damaged in shipment or handling.

The L-shaped paped lining or piece 20 has two legs 24 and 26 which latter are disposed at a right angle to each other by interconnecting but outwardly protruding portion 28 of the paper which protrudes outwardly thereto and is also suitably glued to the outwardly protruding portion 16 of the metal piece 10.

The paper legs 24 and 26 extend outwardly beyond the metal legs 12 and 14 distances approximately equal to the widths of the legs 12 and 14 respectively.

The metal legs 12 and 14 and the paper legs 24 and 26 all terminate along parallel vertical lines disposed parallel to the elongated straight protrusion 16.

As best seen in Figure 1, holes 30 are provided which extend through both the metal piece 10 and the paper 20, the holes being arranged in spaced apart parallelism along the legs 12 and 14 respectively and being disposed approximately midway between the protrusion 16 and the outer edges of the legs 12 and 14. The holes or openings 30 of the metal legs and paper lining are in registering relation whereby binding posts are provided between the joint cement and plaster covering the outer surface of the wall and extended to points spaced from the vertex of the L-shaped strips so that outer surfaces of the strips are exposed.

Further rows of holes 34 are provided which each comprises vertically spaced apart holes through the paper legs 24 and 26.

The preferred dimensions of the bead are those of a one inch wide metal strip bent to the shape shown with the formation of the protrusion 16 either at the center of the strip or to one side of the center of the strip whereby the leg 12 is substantially shorter than the leg 14.

The paper or tape piece 20 is preferably seven-eighths of an inch wide in its shorter leg 24 while on its longer leg 26 the width of the tape is one and three-eighths inches.

The reason for this unbalanced shape will shortly be described.

Referring to Figures 3 and 4 the corner of a dry wall construction is shown in which two pieces of Sheetrock 40 and 42 are disposed covering a corner joist 44 with the Sheetrock section 40 overlapping the end of the Sheetrock section 42. In the formation of such joints the edge of the overlapping Sheetrock member 40 will be straight as it is unaltered from its shape as it comes from the factory. However the other Sheetrock member 42 has its adapting edge 46 cut on the job side and usually it cannot be an even cut. For this reason the longer legs 14 and 26 of the metal and paper parts of the new corner bead are respectively laid against the undercovering the joint made at the end 46 of the abutting dry wall member 42.

Referring now to Figure 4, it will be seen that the method of application is first to place joint cement in a layer 50 along each edge of the respective walls forming the corner and then to place the corner bead against the joint cement troweling the corner bead into place so that air bubbles work up through the holes 30 and 34 and passes through the edges of the paper or tape portion 20.

It will be seen that the paper is so thin that it juts out from the wall board only to a very slight extent as is desirable to make the new corner bead easy to completely cover and conceal with the latter coat of joint cement.

It will be seen that some of the joint cement 50 oozes past the outer edges of the paper legs 24 and 26, as best seen at 52. This provides a sufficiently smooth edge that only one other coat of joint cement is necessary.

The other coat of joint cement is best seen at 60 and it will be seen that it can be easily applied by trowel inasmuch as the projection 16 serves as a straight edge called a "grout" in the trade against which a trowel can be guided.

It will be found that when the joint cement has hardened the new corner bead is more strongly bonded to the wall than the corner beads presently used partly because of the great adherence of joint cement to the porous paper and partly because joint cement forms a better securing medium than nails.

The new corner bead is more rapidly applied than has heretofore been possible and otherwise fulfills all the objectives above set forth.

It will be seen that as described the joint cement extending through the holes 30 and 34 has the effect of forming rivets which rivet the outer layer of joint cement to the inner layer of joint cement which is itself well fixed to the Sheetrock. The rivets so formed tend to hold the parts of the corner bead itself together and in that way assist the rubber base cement 22 in its action.

I have found that when rubber base cement is used the bonding between the metal and the paper is sufficient that it is possible to make a practical corner construction with the holes through the bead. However the strength of the corner is much more effective when the bead has apertures therethrough.

From the foregoing description, it is thought to be obvious that a corner bead constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

A corner protector for dry wall construction including an L-shaped strip of paper having legs connected by an outwardly bulging arcuate section and said legs having spaced openings therein, and an L-shaped metal strip having legs connected by an outwardly bulging arcuate section and said legs of the metal strip also having spaced openings therein, the parts being assembled in use whereby the paper strip is positioned on surfaces of walls extending from a corner and the legs of the metal strip are positioned against the legs of the paper strip with the outwardly bulging section of the paper strip nested in the outwardly bulging section of the metal strip and with the openings of the legs of the metal strip in registering relation with inner rows of openings of the paper strip, said openings of the strips being relatively large and of sufficient size to receive plaster for forming binding posts for anchoring plaster of the wall surfaces to the strips, the legs of the paper strip being secured to the wall sections, and the legs of the metal strip to the legs of the paper strip by suitable adhesive.

References Cited in the file of this patent

UNITED STATES PATENTS

| | | |
|---|---|---|
| 2,593,859 | Dunlap | Apr. 22, 1952 |
| 2,643,423 | Brendel | June 30, 1953 |